A. M. SONNICHSEN.
AUTOMOBILE BUFFER.
APPLICATION FILED JUNE 15, 1914.
1,135,066.
Patented Apr. 13, 1915.
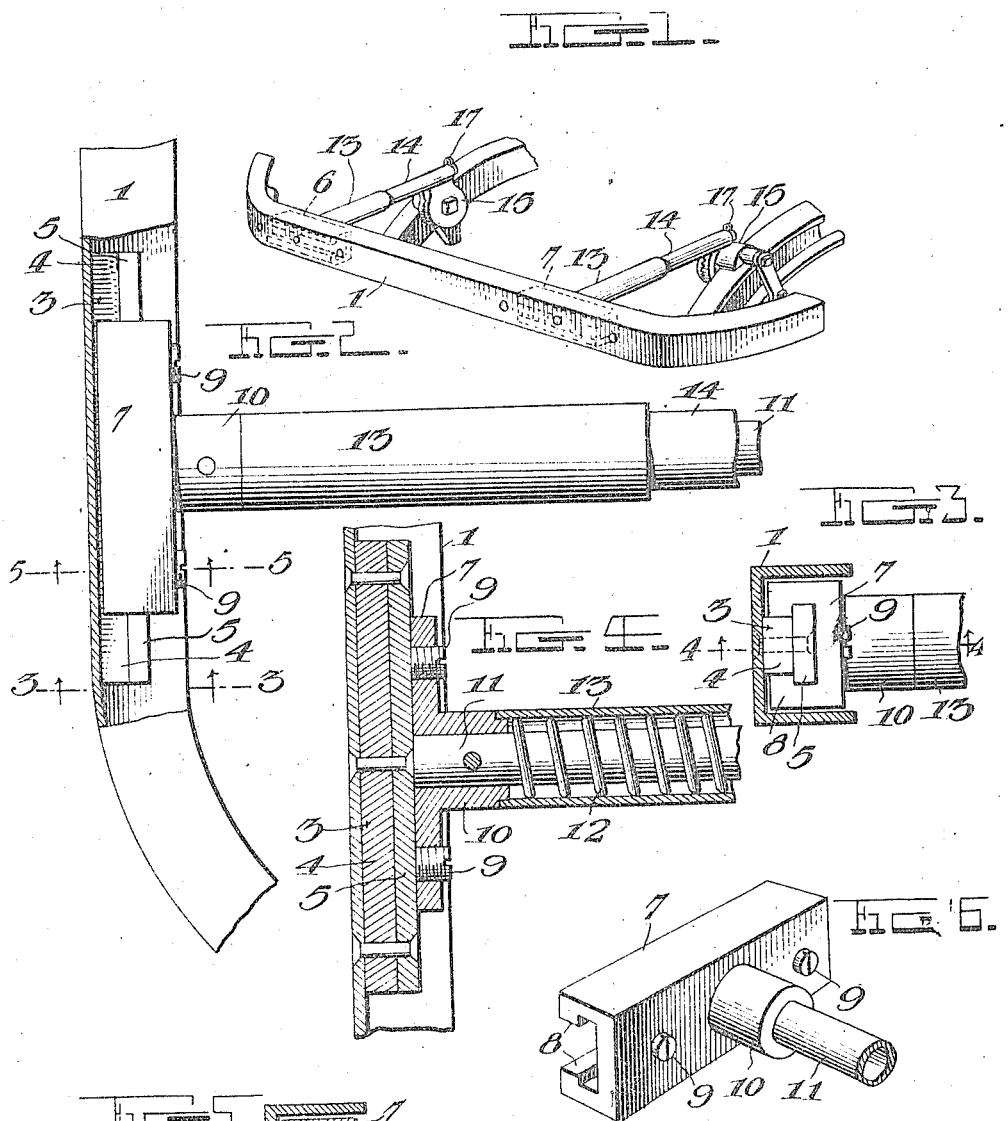
Inventor
A. M. Sonnichsen
Witnesses
H. Woodard
By H. R. Williamson &Co.
Attorneys

UNITED STATES PATENT OFFICE.

ANDREAS M. SONNICHSEN, OF MILWAUKEE, WISCONSIN, ASSIGNOR TO THE AUTO PARTS MFG. CO., OF MILWAUKEE, WISCONSIN.

AUTOMOBILE-BUFFER.

1,135,066.  Specification of Letters Patent.  Patented Apr. 13, 1915.

Application filed June 15, 1914. Serial No. 845,291.

*To all whom it may concern:*

Be it known that I, ANDREAS M. SONNICHSEN, a citizen of the United States, residing at Milwaukee, in the county of Milwaukee and State of Wisconsin, have invented certain new and useful Improvements in Automobile-Buffers; and I do declare the following to be a full, clear, and exact description of the invention, such as will enable others skilled in the art to which it appertains to make and use the same.

This invention relates to buffers intended for use on automobiles and pertains more especially to that type wherein a horizontally disposed buffer bar is elastically mounted upon and in advance of the usual elliptic springs supporting the front part of the automobile body.

The object of the invention is to provide a buffer of this type having means for adjustably connecting it with the springs at the front of a car whereby it may be used on cars already in use and on those having the supporting springs or frame spaced varying distances apart.

Another object of the invention is to provide a device of this character which will be simple, strong, durable and inexpensive in construction, efficient and reliable in operation, and well adapted to the purpose for which it is designed.

With the above objects in view, the invention resides in certain novel features of construction, combination and arrangement of parts as will be more fully described and claimed.

In the accompanying drawings: Figure 1 represents a perspective view of the front portion of the frame of an automobile having this improved buffer applied; Fig. 2 is an enlarged detail plan view with parts broken out; Fig. 3 is a transverse vertical section taken on the line 3—3 of Fig. 2; Fig. 4 is an enlarged detail horizontal section taken on the line 4—4 of Fig. 3; Fig. 5 is a transverse section taken on the line 5—5 of Fig. 2; and Fig. 6 is a detail perspective view of one of the coupling members.

In the embodiment illustrated, a bumper or buffer bar 1 is shown constructed of angle iron substantially U-shaped in cross section and with its ends curved laterally inward in the usual manner. This buffer is disposed in front of the vehicle as usual and has secured to the inner face of its cross bar, longitudinally spaced coupling members as 3 which are substantially T-shaped in cross section as shown in Figs. 3 and 5. These members are here shown composed of two thick plates or bars 4 and 5 riveted together for the sake of economy in construction, it being obvious that they may be made integral if found desirable. The member 5 extends laterally at its opposite edges beyond the sides of the member 4 forming the head of the T-shaped coupling member, the heads of the rivets which secure said members 3 in position on the bar 1, being countersunk flush with the outer face of said bar 1 so that they will be invisible when the bar is nickeled or painted.

Slidable longitudinally on the coupling members 3 are coöperating coupling members 6 and 7 here shown in the form of angle irons substantially U-shaped in cross section with inturned flanges 8 on the free edges of the side members thereof which are adapted to extend under the head elements 5 of the members 3 whereby said coupling members 6 and 7 may be adjusted on said members 3 to bring them nearer together or dispose them farther apart as may be desired.

Set screws 9 extend through the inner wall or cross bar of the members 6 and 7 and are designed to engage the members 3 for locking the coupling members 6 and 7 in adjusted position.

The members 6 and 7 each has a hollow boss 10 extending laterally outward from its wall or cross bar and in which is secured a buffer bar supporting and guiding rod 11. Around this rod 11 is a coil buffer spring 12 inclosed in a casing 13. The supporting rod 11 has a sliding engagement at its free end with a sleeve or tubular guide and supporting member 14 of a buffer supporting bracket 15 which forms part of the fastening for securing the buffer bar to the car. The rod 11 extends entirely through this sleeve 14 and is held in operative engagement therewith by a cotter pin 17 or similar fastening arranged through the inner end of the rod as shown in Fig. 1 and which permits said rod to move rearward but limits its forward movement.

The front end of the sleeve 14 telescopically engages the casing 13 and the buffer spring 12 is arranged between this front end of the sleeve 14 and the shoulder formed by the end of the boss 10. This spring yieldingly projects and holds the rod 11 and the bumper bar 1 in a projected position and absorbs all shocks which are produced when the buffer bar 1 is brought into forcible engagement with an obstruction. The fastening for securing this buffer bar to the elliptical springs of a car may be of any suitable or desired construction and in the form shown, is similar to that described and shown in my Patent 1,088,471 dated February 24, 1914 and as it forms no part of this invention, it is not thought necessary to describe it in detail herein.

From the above description, it will be obvious that the buffer bar 1 may be adjusted to fit cars, the side bars of the frames of which are differently spaced and that the peculiar form of bar protects the coupling members thereof and avoids all danger of breakage of these parts.

I claim as my invention:

1. An automobile buffer comprising a buffer bar composed of an angle iron substantially U-shaped in cross section with the flanges thereof extending inwardly, longitudinally spaced coupling elements mounted therein and having undercut sides, cushioning means for connecting said bar with an automobile frame, and having coupling elements provided with inturned flanges for slidably engaging the undercut sides of the coupling elements within said bar, and means for fastening said elements in adjusted position.

2. An automobile buffer comprising a buffer bar composed of angle iron substantially U-shaped in cross section with the flanges thereof extending inwardly, longitudinally spaced coupling elements mounted therein, said elements being substantially T-shaped in cross section with the heads thereof extending rearwardly, cushioning means for connecting said bar with an automobile frame having coupling elements at their outer ends in the form of angle irons substantially U-shaped in cross section, their flanges extending outwardly and with inturned flanges at the free edges thereof for sliding engagement beneath the heads of the coupling elements within the bar, and set screws for locking said coöperating elements in adjusted position.

In testimony whereof I have hereunto set my hand in presence of two subscribing witnesses.

ANDREAS M. SONNICHSEN.

Witnesses:
J. D. MILLAR,
OTTO L. SCHAEFER.